(12) United States Patent
Matsuda

(10) Patent No.: US 9,238,497 B2
(45) Date of Patent: Jan. 19, 2016

(54) ELECTRIC MOTORCYCLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/369,673

(22) PCT Filed: Dec. 28, 2011

(86) PCT No.: PCT/JP2011/007333
§ 371 (c)(1),
(2), (4) Date: Jul. 7, 2014

(87) PCT Pub. No.: WO2013/098892
PCT Pub. Date: Jul. 4, 2013

(65) Prior Publication Data
US 2014/0367184 A1    Dec. 18, 2014

(51) Int. Cl.
*B62K 25/28* (2006.01)
*B62K 11/04* (2006.01)

(52) U.S. Cl.
CPC ............... *B62K 25/283* (2013.01); *B62K 11/04* (2013.01); *B62K 2204/00* (2013.01); *B62K 2208/00* (2013.01)

(58) Field of Classification Search
CPC .. B62K 25/283; B62K 11/04; B62K 2208/00; B62K 2204/00
See application file for complete search history.

(56) References Cited

U.S. PATENT DOCUMENTS

| | | | |
|---|---|---|---|
| 8,556,018 B2 * | 10/2013 | Fujihara et al. | 180/220 |
| 2004/0217574 A1 * | 11/2004 | Horii et al. | 280/284 |
| 2005/0087947 A1 * | 4/2005 | Fujita | 280/124.128 |
| 2005/0263334 A1 * | 12/2005 | Okabe et al. | 180/219 |
| 2006/0251946 A1 * | 11/2006 | Makuta et al. | 429/34 |
| 2007/0068296 A1 * | 3/2007 | Oda et al. | 74/329 |
| 2009/0008900 A1 * | 1/2009 | Ishikawa et al. | 280/291 |
| 2009/0075152 A1 * | 3/2009 | Horji et al. | 429/34 |
| 2010/0032225 A1 * | 2/2010 | Oohashi et al. | 180/219 |
| 2010/0078249 A1 * | 4/2010 | Nishiura et al. | 180/220 |
| 2010/0163326 A1 * | 7/2010 | Takamura et al. | 180/68.5 |
| 2010/0258374 A1 * | 10/2010 | Tamura | 180/309 |

(Continued)

FOREIGN PATENT DOCUMENTS

| | | |
|---|---|---|
| JP | 55175592 | 12/1980 |
| JP | 6393291 U | 6/1988 |

(Continued)

OTHER PUBLICATIONS

ISA Japanese Patent Office, International Search Report of PCT/JP2011/007333, Apr. 17, 2012, WIPO, 2 pages.
European Patent Office, Extended European Search Report Issued in Application No. 11878371.1, Jul. 24, 2015, Germany, 4 pages.

*Primary Examiner* — Kevin Hurley
*Assistant Examiner* — Gabriela C Craciun
(74) *Attorney, Agent, or Firm* — Alleman Hall McCoy Russell & Tuttle LLP

(57) ABSTRACT

An electric motorcycle comprises a motor case which is provided at a rear portion of a vehicle body frame; a swing arm which is pivotably coupled at its front end portion to the rear portion of the vehicle body frame; and a rear suspension coupled to the vehicle body frame and the swing arm. The lower end portion of the rear suspension is located below the swing arm, and the rear suspension extends vertically in a location close to a pivot around which the swing arm is pivotable.

14 Claims, 3 Drawing Sheets

(56) References Cited

U.S. PATENT DOCUMENTS

| | | | | |
|---|---|---|---|---|
| 2010/0300785 A1* | 12/2010 | Tamura | | 180/68.5 |
| 2011/0036657 A1* | 2/2011 | Bland et al. | | 180/220 |
| 2011/0139531 A1* | 6/2011 | Kanno et al. | | 180/220 |
| 2012/0103706 A1* | 5/2012 | Kondo et al. | | 180/65.1 |
| 2012/0318600 A1* | 12/2012 | Hakamata et al. | | 180/220 |
| 2013/0180792 A1* | 7/2013 | Toftner | | 180/219 |
| 2013/0229072 A1* | 9/2013 | Matsuda | | 310/53 |
| 2013/0233634 A1* | 9/2013 | Matsuda | | 180/220 |
| 2013/0270022 A1* | 10/2013 | Matsuda | | 180/220 |
| 2013/0270940 A1* | 10/2013 | Matsuda | | 310/64 |
| 2013/0292198 A1* | 11/2013 | Matsuda | | 180/220 |
| 2013/0300236 A1* | 11/2013 | Matsuda | | 310/74 |
| 2014/0058609 A1* | 2/2014 | Matsuda | | 701/22 |
| 2014/0060951 A1* | 3/2014 | Kashiwai et al. | | 180/210 |

FOREIGN PATENT DOCUMENTS

| | | |
|---|---|---|
| JP | 05105176 A | 4/1993 |
| JP | 2000038184 A | 2/2000 |
| JP | 2003182676 A | 7/2003 |
| JP | 2004175223 A | 6/2004 |
| JP | 2009073411 A | 4/2009 |
| WO | 2006006435 A1 | 1/2006 |

* cited by examiner

ELECTRIC MOTORCYCLE

TECHNICAL FIELD

The present invention relates to an electric motorcycle which activates a rear wheel by using driving power generated by an electric motor.

BACKGROUND ART

In recent years, an electric motorcycle which incorporates as a driving power source an electric motor activated by electric energy stored in a battery has been developed. Since the electric motorcycle does not incorporate an engine, devices required for the engine, such as intake and exhaust systems are unnecessary (see e.g., Patent Literature 1).

CITATION LIST

Patent Literature

Patent Literature 1: Japanese Laid-Open Patent Application Publication No. 2009-73411

SUMMARY OF INVENTION

Technical Problem

In a motorcycle incorporating the engine, the exhaust system is typically placed below a swing arm. For this reason, a rear suspension extends upward from the swing arm. This makes the center of gravity of the motorcycle high. In addition, it becomes necessary to ensure a space above the swing arm, in which the rear suspension is placed. In particular, since the electric motorcycle incorporates a battery with a large size, the center of gravity of the electric motorcycle tends to be high.

Accordingly, an object of the present invention is to provide an electric motorcycle which can lower a center of gravity thereof.

Solution to Problem

The present invention has been developed to achieve the above object. According to the present invention, there is provided an electric motorcycle which activates a rear wheel by using driving power generated by an electric motor, comprising: a vehicle body frame; a motor case which is provided at a rear portion of the vehicle body frame and accommodates the electric motor; a swing arm which is pivotably coupled at its front end portion to the rear portion of the vehicle body frame and supports the rear wheel by its rear end portion such that the rear wheel is rotatable; and a rear suspension coupled to the vehicle body frame and the swing arm, wherein a lower end portion of the rear suspension is located below the swing arm, and the rear suspension extends vertically in a location close to a pivot around which the swing arm is pivotable.

In accordance with this configuration, in the electric motorcycle which does not include an exhaust system, the lower portion of the rear suspension can be efficiently placed in a space below the swing arm. Therefore, the center of gravity of the electric motorcycle can be lowered, and a space in which other component is placed can be formed above the swing arm. The rear suspension extends vertically and is close to the pivot. In this structure, the components with heavy weights can be concentratively arranged in a forward and rearward direction, and the turning capability of the electric motorcycle can be improved.

The electric motorcycle may comprise a link mechanism which is placed below the swing arm and operates according to a pivot motion of the swing arm, and the link mechanism may include a suspension bracket which is pivotable with respect to the vehicle body frame and the swing arm, and the lower end portion of the rear suspension may be coupled to the suspension bracket and connected to the swing arm via the link mechanism.

In accordance with this configuration, the link mechanism can be placed without considering an interference with an exhaust system. Also, by adjusting a link ratio of the link mechanism, a relation of an extension/contraction amount of the rear suspension with respect to a rotation amount of the swing arm can be adjusted, and hence the swing arm and the rear suspension can be designed more flexibly.

The rear suspension bracket may be pivotably coupled to a bottom portion of the motor case.

In accordance with this configuration, the rear suspension can be placed at a lowest possible position, and is closer to the motor case. Therefore, the components with heavy weights can be concentratively arranged.

A bottom portion of the motor case may constitute an oil pan reserving oil for cooling or lubricating a portion of the electric motorcycle, and the suspension bracket may be coupled to the oil pan.

In accordance with this configuration, in the electric motorcycle in which the oil pan can be reduced in size rather than the engine, the stiffness of the oil pan can be enhanced. In accordance with the above configuration, since the rear suspension is mounted to such an oil pan, the rear suspension can be stably mounted in the electric motorcycle.

An upper end portion of the rear suspension may be connected to the motor case.

In accordance with this configuration, since the rear suspension is close to the motor case, the components with heavy weights can be concentratively arranged.

The motor case may accommodate the electric motor and a transmission mechanism which changes a speed of driving power generated by the electric motor, and the electric motor and the transmission may be arranged substantially vertically, the rear suspension may extend substantially vertically to conform in shape to a rear surface of the motor case, and the upper end portion of the rear suspension may be connected to an upper portion of the motor case.

In accordance with this configuration, since the bottom portion of the motor case can be reduced in size in the forward and rearward direction, the oil pan can be reduced in volume, and the stiffness of the oil pan can be suitably improved. Since the motor case extending vertically covers the front side of the rear suspension, it becomes possible to suitably prevent a situation in which the rear suspension is contaminated by muddy water splashing from forward.

The electric motor may be placed rearward relative to the transmission mechanism.

In accordance with this configuration, the motor case extends such that it is inclined slightly rearward from its lower end toward its upper end. This allows the upper end portion of the rear suspension to be easily suspended from the upper portion of the motor case, and the motor case to suitably receive a load applied upward along the axial direction of the rear suspension.

An input shaft of the transmission mechanism may be placed above the pivot.

In accordance with this configuration, the electric motor can be placed higher than the pivot. This allows the upper end portion of the rear suspension to be joined to the electric motor in a location close to the center of the electric motor.

The motor case may include a passage through which a coolant for the electric motor is guided to the transmission mechanism as a lubricant.

In accordance with this configuration, in a case where a coolant for the electric motor is used as a lubricant for the transmission mechanism, the lubricant can be guided to the transmission mechanism by its own weight, because the transmission mechanism is placed below the electric motor. Therefore, a cooling system and a lubricating system can be configured simply.

The pivot may be mounted to the motor case.

In accordance with this configuration, since the swing arm and the rear suspension are connected to the motor case, a unit of them can be mounted to the vehicle body frame. Therefore, the electric motorcycle can be assembled easily. In addition, a mounting error is less likely to occur.

Advantageous Effects of Invention

As should be appreciated from the above, in accordance with the present invention, it is possible to provide an electric motorcycle which can lower a center of gravity thereof.

DESCRIPTION OF EMBODIMENTS

Hereinafter, an embodiment of the present invention will be described with reference to the accompanying drawings. Throughout the drawings, the same or corresponding components are designated by the same reference symbols and will not be described repeatedly in detail. The stated directions are referenced from the perspective of a rider riding in an electric motorcycle according to the embodiment of the present invention.

Figure 1:
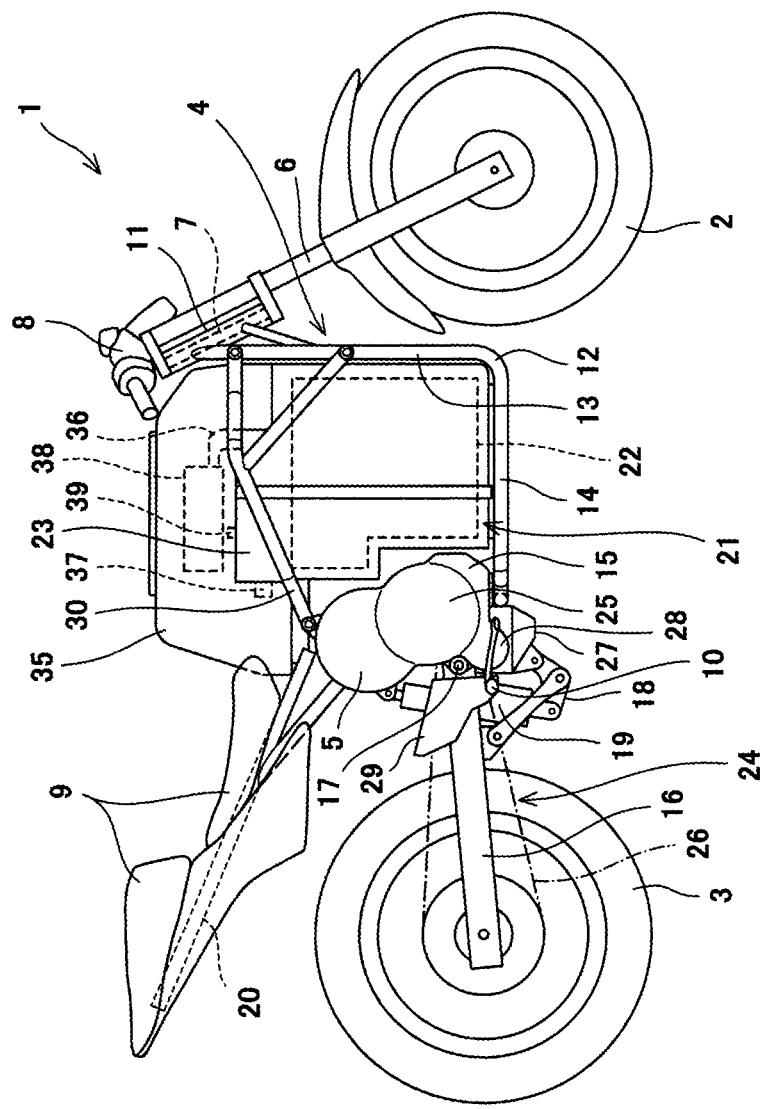
FIG. 1 is a right side view of an electric motorcycle according to an embodiment of the present invention.

FIG. 1 is a right side view of an electric motorcycle 1 according to Embodiment 1 of the present invention. As shown in FIG. 1, the electric motorcycle 1 includes a front wheel 2 which is a driven wheel, a rear wheel 3 which is a drive wheel, a vehicle body frame 4 disposed between the front wheel 2 and the rear wheel 3, and an electric motor 5 which is a driving power source for moving the electric motorcycle 1. The electric motorcycle 1 of the present embodiment is not equipped with an internal combustion engine and is configured to rotate the rear wheel 3 by using driving power generated by the electric motor 5.

The front wheel 2 is rotatably mounted to the lower portion of a front fork 6 extending substantially vertically. A steering shaft 7 for steering the front wheel is coupled to the upper portion of the front fork 6, and a handle 8 is attached to the upper portion of the steering shaft 7.

The vehicle body frame 4 includes a head pipe 11 and a pair of right and left main frames 12. The steering shaft 7 is supported by the head pipe 11 such that the steering shaft 7 is rotatable. The main frames 12 are unitarily joined to the head pipe 11. The main frames 12 include down frame members 13 extending downward from the head pipe 11 and lower frame members 14 extending rearward from the lower ends of the down frame members 13. The rear end portions of the lower frame members 14 are joined to a motor case 15 accommodating the electric motor 5. The motor case 15 accommodating the electric motor 5 is provided at a rear side of the vehicle body frame 4.

A swing arm 16 is coupled to the motor case 15. The swing arm 16 extends substantially in a forward and rearward direction. The swing arm 16 is pivotably coupled at its front end portion to the motor case 15 and supports the rear wheel 3 by its rear end portion such that the rear wheel 3 is rotatable. The motor case 15 has a flange protruding rearward from the rear lower portion thereof. A pivot 17 around which the swing arm 16 is pivotable is oriented in a rightward or leftward direction so as to penetrate the flange. In this way, in the present embodiment, the motor case 15 serves as a swing arm bracket coupled to the swing arm 16 such that the swing arm 16 is pivotable. Thus, the number of components can be reduced.

A link mechanism 18 which operates in response to the pivot motion of the swing arm 16 is provided between the lower portion of the swing arm 16 and the bottom portion of the motor case 15. The lower end portion of a rear suspension 19 is coupled to the link mechanism 18 such that the rear suspension 19 is pivotable. The upper end portion of the rear suspension 19 is coupled to the rear portion of the motor case 15 such that the rear suspension 19 is pivotable. In this way, the motor case 15 also serves as a fastening suspension bracket for mounting the end of the rear suspension 19 to the vehicle body frame 4.

The motor case 15 is also joined to a seat frame 20. The seat frame 20 extends rearward from the upper portion of the motor case 15 such that it is inclined upward. A seat 9 on which the rider and a passenger are seated in the forward and rearward direction is mounted to the seat frame 20. The electric motorcycle is a straddle vehicle. The rider is seated on the seat 9 while straddling a vehicle body. A pair of right and left foot steps 10 are placed rearward relative to the motor case 15 and mounted to the left side portion and right side portion of a chain cover 29. The rider seated on the seat 9 while straddling the vehicle body puts the rider's right and left foot soles on the pair of foot steps 10, respectively. The motor case 15 is placed forward relative to a straight line connecting the seat 9 (e.g., rear end portion of the rider seat) to the foot step 10 and close to the straight line. This allows the motor case 15 to be placed in a location adjacent the rider's legs. As compared to a case where a battery unit 21 of a large size in a rightward or leftward direction is placed in this location, the rider's driving posture can be easily stabilized.

The electric motorcycle 1 incorporates a battery unit 21 as an electric power supply for the electric motor 5. The battery unit 21 includes a battery 22 for storing DC power, and a battery case 23 accommodating the battery 22. The battery case 23 is supported on the lower frame members 14 of the main frames 12. An inverter (not shown) converts the DC power stored in the battery 22 into AC power. The electric motor 5 is activated by the AC power supplied from the inverter to generate the driving power for moving the vehicle body. The driving power generated by the electric motor 5 is transmitted to the rear wheel 3 via a driving power transmission mechanism 24. This allows the rear wheel 3 to rotate. As a result, the electric motorcycle 1 can drive.

The driving power transmission mechanism 24 includes a transmission 25 and a chain 26. The transmission 25 is able to select its change gear ratio from among a plurality of change gear ratios, and change the speed of the rotation of an output shaft of the electric motor 5 with the selected change gear ratio. The transmission 25 may be, for example, a multistage constant-mesh manual transmission including a dog clutch. Or, the transmission 25 may be a gearless transmission or an automatic transmission. The chain 26 serves to transmit to the rear wheel the rotation whose speed has been changed by the transmission 25. In the present embodiment, the motor case 15 accommodates the transmission 25 together with the electric motor 5. The electric motor 5 and the transmission 25 are arranged in the vertical direction. The electric motor 5 is positioned above the transmission 25.

When the motor case 15 accommodates the electric motor 5 and the transmission 25, the motor case 15 is increased in size in a direction in which the electric motor 5 and the transmission 25 are arranged. In the present embodiment, the electric motor 5 and the transmission 25 are arranged vertically, and as a result, the motor case 15 is placed so as to extend vertically. The bottom portion of the motor case 15 constitutes an oil pan 27 for reserving oil. The oil is utilized as a coolant for cooling the electric motor 5 and as a lubricant for lubricating sliding sections of the transmission 25. The motor case 15 accommodates an oil pump 28 which discharges the oil reserved in the oil pan 27. The oil pump 28 is placed below the transmission 25 and above the oil pan 27.

The electric motor 5 is placed above the transmission 25 and positioned in the upper portion in the interior of the motor case 15 provided with the pivot 17. This allows the output shaft of the electric motor 5 to be placed in the vicinity of a straight line connecting the axle of the rear wheel 3 to the head pipe 11 when viewed from a side. As a result, driving feeling can be improved.

Sub-frames 30 are placed above the main frames 12. Although the main frames 12 are composed of the pair of right and left main frames and the sub-frames 30 are composed of a pair of right and left sub-frames, only the right main frame 12 and the right sub-frame 30 are shown in FIG. 1. The sub-frames 30 are provided and connected between the front side of the vehicle body frame 4 and the rear side of the vehicle body frame 4. The sub-frames 30 can be detachably joined to the vehicle body frame 4. Therefore, by putting the battery unit 21 on the main frames 12 with the sub-frames 30 detached, and then joining the sub-frames 30 to the main frames 12 and the motor case 15, the battery unit 21 can be mounted in the vehicle. This allows the battery unit 21 to be easily mounted in the electric motorcycle, and the side portions of the battery unit 21 to be retained by the sub-frames 30.

The upper portion of the battery case 23 is covered with an air box 35. An intake duct 36 is attached to the upper portion of the battery case 23. A discharge duct 37 is coupled to an outlet 23a (see FIG. 2) formed in the rear wall of the battery case 23. The intake duct 36 and the discharge duct 37 open in the interior of the air box 35. The air box 35 is able to take in ram air from forward. The air taken into the air box 35 is sent to the battery case 23 via the intake duct 36, flows rearward in the interior of the battery case 23 and is discharged to the interior of the air box 35 via the discharge duct 37. This allows the battery 22 inside the battery case 23 to be suitably cooled by the air. Even when the ram air contains a moisture, the moisture can be captured in the interior of the air box 35, which makes it possible to suppress ingress of the moisture into the battery case 23. The inner space of the air box 35 can be utilized as a space in which electric components 38 are placed. By protruding a terminal 39 connected to the battery 22 from the upper portion of the battery case 23, the electric components 38 inside the air box 35 can be easily connected to the battery 22, which provides an advantage.

Figure 2:
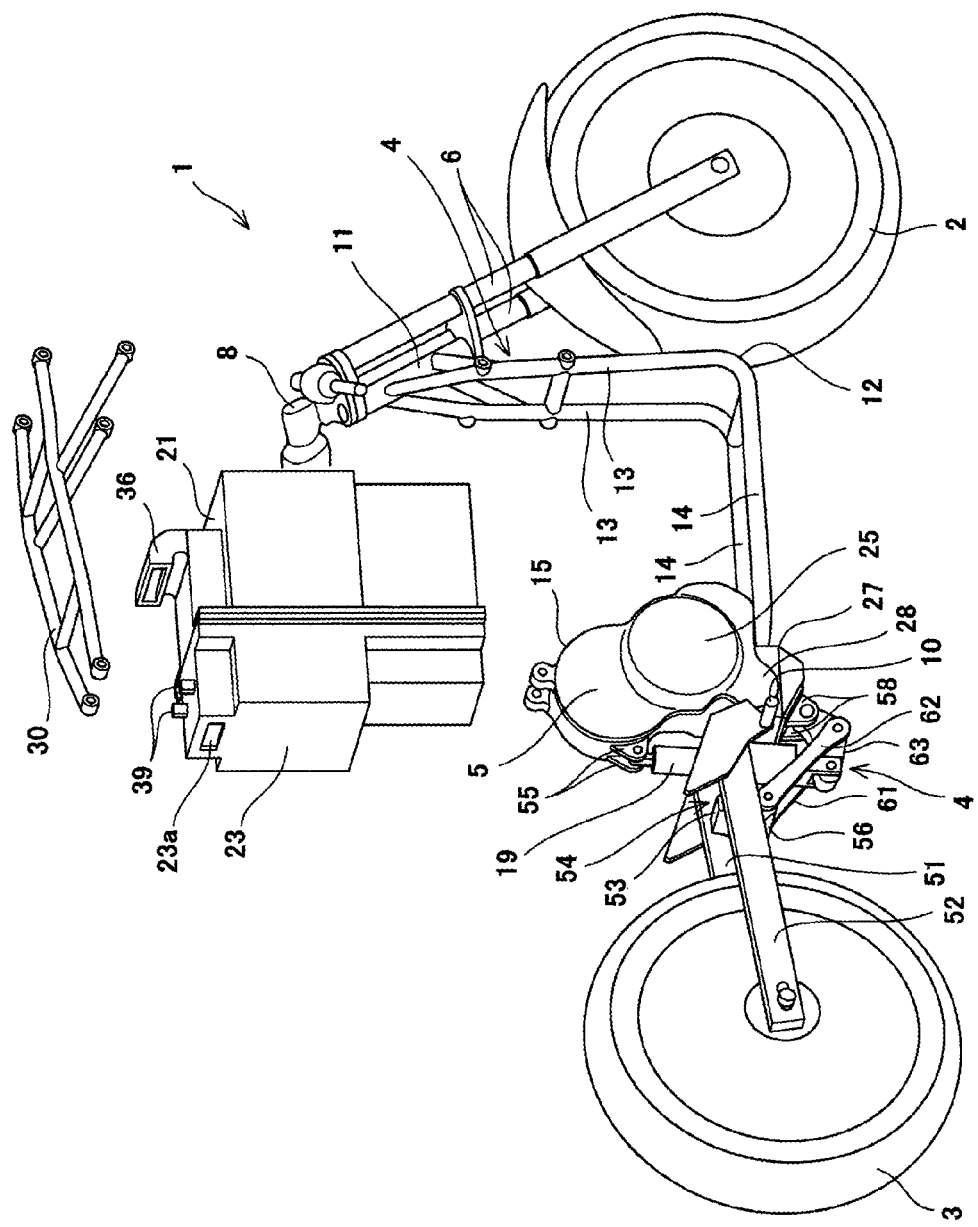
FIG. 2 is a perspective view showing components of the electric motorcycle of FIG. 1.

FIG. 2 is a perspective view showing components of the electric motorcycle 1 of FIG. 1. As shown in FIG. 2, the swing arm 16 includes a pair of arm members 51, 52, and a cross member 53 coupling the left and right arm members 51, 52 in a location which is forward relative to the rear wheel 3 and rearward relative to the motor case 15. When viewed from above, the swing arm 16 has a H-shape. In a space forward relative to the cross member 53, there is formed an opening 54 surrounded by the cross member 53, the pair of arm members 51, 52, and the motor case 15. The opening 54 opens upward and downward.

The rear suspension 19 is placed to be vertically inserted from the opening 54. The upper end portion of the rear suspension 19 protrudes upward from the opening 54 and is coupled to a pair of flanges 55 provided in the rear portion of the motor case 15 such that the rear suspension 19 is pivotable. The lower end portion of the rear suspension 19 protrudes downward from the opening 54 and is coupled to the above stated link mechanism 18.

The link mechanism 18 is placed below the swing arm 16 (in other words, below a straight line connecting the pivot 17 to the center of the rear wheel 3) when viewed from a side and rearward relative to the motor case 15. The lower portions of the left and right arm members 51, 52 are provided with a flange 56 to which the link mechanism 18 is mounted. The rear portion of the oil pan 27 is provided with a pair of flanges 58 to which the link mechanism 18 is mounted.

The link mechanism 18 includes a pair of left and right levers 61, 62 and a suspension bracket 63. The suspension bracket 63 is a metal plate of a L-shape, and includes an intermediate bent portion, one end portion extending from the bent portion and the other end portion extending from the bent portion in a direction different from a direction in which one end portion extends. The suspension bracket 63 is pivotably coupled at one end portion thereof to the pair of flanges 58 of the oil pan 27 with the suspension bracket 63 sandwiched between the flanges 58. The suspension bracket 63 protrudes rearward from the flanges 58.

The left lever 61 is pivotably coupled at one end portion thereof to the flange 56 of the left arm member 51. The left lever 61 extends downward from the lower portion of the left arm member 51 such that it is inclined forward and is pivotably coupled on the other end portion thereof to the bent portion of the suspension bracket 63. The right lever 62 extends in parallel with the left lever 61. The right lever 62 is pivotably coupled at one end portion thereof to the right arm member 52 and at the other end portion thereof to the bent portion of the suspension bracket 63. The bent portion of the suspension bracket 63 is sandwiched between the left and right levers 61, 62.

The lower end portion of the rear suspension 19 is inserted through a space between the left and right levers 61, 62 and is coupled to the other end portion of the suspension bracket 63 such that the rear suspension 19 is pivotable. The lower end portion of the rear suspension 19 is provided with devises between which the other end portion of the suspension bracket 63 is sandwiched.

In the above described manner, the lower end portion of the rear suspension 19 is coupled to the swing arm 16 via the suspension bracket 63. The suspension bracket 63 is pivotably coupled to the oil pan 27 constituting the bottom portion of the motor case 15.

Figure 3:
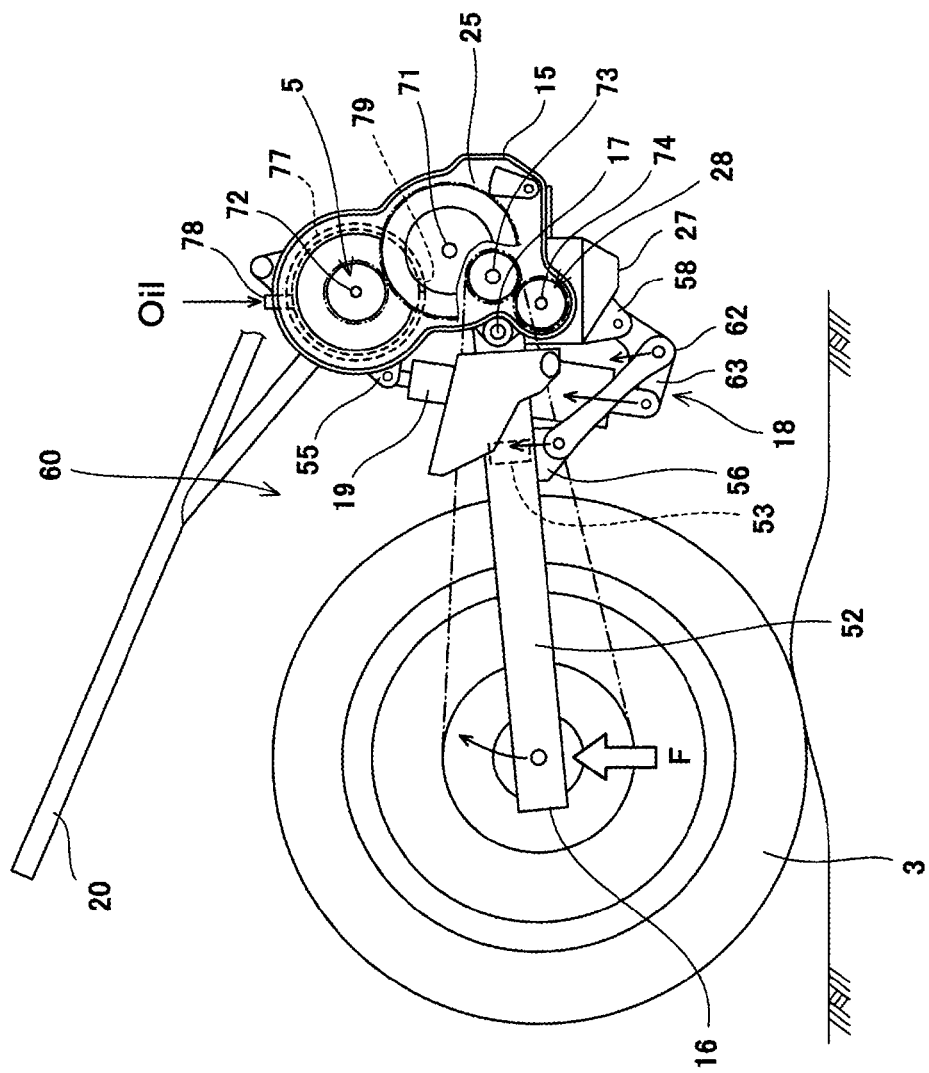
FIG. 3 is a right side view showing a region surrounding a rear suspension of the electric motorcycle of FIG. 1.

FIG. 3 is a right side view showing a region surrounding the rear suspension 19 of the electric motorcycle 1 of FIG. 1. FIG. 3 shows the motor case 15 in a state in which the cover covering the right portion of the motor case 15 is detached. As shown in FIG. 3, it is supposed that the rear wheel 3 is rolling on a bumpy load surface and an upward force F is exerted on the rear wheel 3. In this case, the rear end portion of the swing arm 16 is raised up by the rear wheel 3, and the swing arm 16 is pivoted clockwise in a right side view (i.e., upward) around the pivot 17 at the front end. According to this pivot motion, the flange 56 is pivoted upward around the pivot 17 together with the swing arm 16. This causes the levers 61, 62 to be raised. Thereby, the bent portion of the suspension bracket 63 is raised by the levers 61, 62, and the suspension bracket 63 is pivoted around the pivots provided in the flanges 58 of the motor case 15. At this time, the other end portion of the suspension bracket 63 is displaced upward. Thereby, an upward force is applied to the lower end portion of the rear suspension 19, which absorbs this applied force. In this way, the rear wheel 3 can be maintained in a properly grounded state.

In a motorcycle incorporating an engine, typically, an exhaust system is laid out in a space in the lower portion of the motorcycle. The electric motorcycle can omit the exhaust system. Attention is paid to this, and in the present embodiment, the lower end portion of the rear suspension 19 is efficiently placed in the space below the swing arm 15. Therefore, the center of gravity of the electric motorcycle can be lowered, and a space 60 in which another component is placed can be formed above the swing arm 15.

The link mechanism 18 which operates according to the pivot motion of the swing arm 16 is placed below the swing arm 16. The lower end portion of the rear suspension 19 is coupled to the suspension bracket 63 of the link mechanism 18. Therefore, even when the lower end portion of the rear suspension 19 is placed below the swing arm 16 (i.e., the rear suspension 19 is not directly coupled to the swing arm 16), the rear suspension 19 is extendable and contractible according to the pivot motion of the swing arm 16. This allows the rear wheel 3 to be maintained in a properly grounded state. Because of the omission of the exhaust system, in the electric motorcycle 1, the link mechanism 18 can be easily placed below the swing arm 16.

In the motorcycle incorporating the engine, there are many slidable portions of a camshaft, a crankshaft, a piston and others, which require plenty of engine oil and an oil pan of a large size for reserving the engine oil. In contrast, in the electric motorcycle 1, there are fewer sliding portions than those of the motorcycle incorporating the engine, and therefore the oil pan 27 can be reduced in size. If the bottom wall of the oil pan 27 is made smaller to reduce the size of the oil pan 27, the side wall extending upward from the edge of the bottom wall will work as a rib relatively effectively. Therefore, by reducing the size of the oil pan 27, the oil pan 27 is allowed to have a higher stiffness without changing the thickness or material.

In the present embodiment, the oil pan 27 has a shape of a bottomed box which opens upward. The upper end portion of the oil pan 27 is in contact with the bottom portion of the motor case 15, and in this state, the oil pan 27 is fastened to the motor case 15 by bolts, or the like. Since the oil pan 27 is separate from the motor case 15, the width of an oil reserving chamber inside the oil pan 27 can be made smaller than the width of the motor case 15. This makes it easier to enhance the stiffness of the oil pan 27.

Attention is paid to this, and in the present embodiment, the suspension bracket 63 is coupled to the oil pan 27 and thereby the link mechanism 18 is fastened to the vehicle body frame 4. By employing such a mounting structure, the link mechanism 18 and the lower end portion of the rear suspension 19 can be placed below the swing arm 16. In addition, the link mechanism 18 can be stably fastened to the vehicle body frame 4.

Regarding a connection between the link mechanism 18 and the vehicle body frame 4, the flanges 58 (downward protruding portions) protrude downward from the bottom portion (oil pan 27) of the motor case 15 to couple with one end portion of the suspension bracket 63 constituting the link mechanism 18. The flanges 58 extend rearward and downward from the rear surface of the oil pan 27. The rear surface of the oil pan 27 constitutes an inclined surface extending rearward as it extends upward. Because of this, the flanges 58 are placed to extend vertically from the inclined rear surface of the oil pan 27. This allows the oil pan 27 to easily receive an impact transmitted from the swing arm 16 to the link mechanism 18 and the flanges 58. The rear surface of the oil pan 27 has a rectangular shape and has four corner portions. The flanges 58 are composed of a pair of right and left flanges. Each of the flanges 58 has a pair of corner portions on the oil pan 27 side. Therefore, the two flanges 58 have the four corner portions. The four corner portions of the flanges 58 substantially conform to the four corner portions of the rear surface of the oil pan 27, respectively. Since the flanges 58 are mounted to the rear surface of the oil pan 27 as described above, the oil pan 27 more easily receives the impact transmitted to the flanges 58.

The rear suspension 19 extends vertically, and crosses the swing arm 16 when viewed from a side. As an exemplary structure for realizing this layout without an interference between the swing arm 16 and the rear suspension 19, in the present embodiment, the swing arm 16 has a H-shape when viewed from above, and the rear suspension 19 is vertically inserted through the opening 54 surrounded by the cross member 53 of the swing arm 16 and the motor case 15. According to this layout, the rear suspension 19 can be placed to extend vertically, and the lower end portion of the rear suspension 19 can be located below the swing arm 16. In addition, the rear suspension 19 is placed forward relative to the cross member 53 of the swing arm 16. This allows the rear suspension 19 extending vertically to be placed close to the motor case 15. Thus, the components with heavy weights can be concentratively arranged in the forward and rearward direction, and as a result, the turning capability of the electric motorcycle can be improved. Furthermore, the rear suspension 19 can be easily placed close to the center in a vehicle width direction. In particular, the suspension bracket 63 is constructed of one plate, and the lower end portion of the rear suspension 19 is attached with the clevises. This allows the suspension bracket 63 to be double-supported, and both of the suspension bracket 63 and the rear suspension 19 to be placed close to the center in the vehicle width direction.

The upper end portion of the rear suspension 19 is coupled to the motor case 15. Thus, the motor case 15, the swing arm 16, the link mechanism 18 and the rear suspension 19 can be handled as a unit of unitary components. Because of this, the electric motorcycle can be assembled in such a manner that the motor case 15, the swing arm 16, the link mechanism 18, and the rear suspension 19, which are constructed as a unit in advance, can be mounted to the vehicle body frame 4 and the rear wheel 3. Therefore, the electric motorcycle can be easily assembled, and a mounting error between the components constructed as a unit is less likely to occur. Moreover, since the motor case 15 serves as a swing arm bracket and a fastening suspension bracket, the number of components and the number of assembling steps can be reduced.

Especially, the upper end portion of the rear suspension 19 is coupled to the upper portion and rear portion of the motor case 15, and the rear suspension 19 extends vertically to conform in shape to the rear surface of the motor case 15. As described above, the rear suspension 19 is also placed close to the motor case 15. In this structure, the front side of the rear suspension 19 is covered with the motor case 15 from forward, and therefore, it becomes possible to suitably prevent the rear suspension 19 from being contaminated by muddy water splashing from forward.

The motor case 15 accommodates the electric motor 5 and the transmission 25 which are arranged vertically. Because of this, the motor case 15 is placed to extend vertically. Therefore, the upper end portion of the rear suspension 19 is easily coupled to the upper portion and rear portion of the motor case 15.

The electric motor 5 is placed above the transmission 25, and an input shaft 71 of the transmission 25 is placed above the pivot 17. In particular, in the present embodiment, the input shaft 71 of the transmission 25 is placed above an output shaft 73 of the transmission 25, and the output shaft 25 of the transmission 25 is placed above the pivot 17. Because of this, the electric motor 5 is placed higher than the pivot 17, and a portion of the motor case 15 which is above the pivot 17 is increased in size. This allows the upper end portion of the rear suspension 19 to be joined to the electric motor 5 in a location close to the center of the electric motor 5.

The motor case 15 is configured such that a peripheral wall forming a circular-arc, the center of which is the input shaft of the transmission 25 when viewed from a side, and a peripheral wall forming a circular-arc, the center of which is the output shaft of the electric motor 5 when viewed from a side, are vertically continuous with each other, to form a gourd shape. The pivot 17 is provided at the rear end portion of the motor case 15. An output shaft 72 of the electric motor 5, the input shaft 71 of the transmission 25, an output shaft 73 of the transmission, and an output shaft 74 of the oil pump 28 are placed forward relative to the pivot 17. The motor case 15 has the flange 55 to mount the upper end portion of the rear suspension 19. The flange 55 is mounted to the peripheral wall forming the circular-arc, the center of which is the output shaft of the electric motor 5. In addition, the flange 55 is mounted to the rear portion and lower portion of the peripheral wall (i.e., a portion extending downward as a tangent line drawn on the circular-arc representing the peripheral wall when viewed from a right side extends forward). In this structure, when an upward load is applied from the link mechanism 18 to the rear suspension 19, the motor case 15 can suitably receive this load.

The flange 55 is placed below the center of the electric motor 5. By comparison, the rear suspension 19 is inclined forward as it extends upward. This makes it possible to prevent the flange 55 from protruding downward from the rear suspension 19.

The electric motor 5 is placed rearward relative to the transmission 25. Specifically, the straight line connecting the output shaft 72 of the electric motor 5 to the input shaft 71 of the transmission 25 extends rearward as it extends upward. The motor case 15 extends such that it is inclined slightly rearward from its lower end toward its upper end. In this structure, a portion of the peripheral wall of the motor case 15, which portion surrounds the electric motor 5, protrudes rearward above the pivot 17. The upper end portion of the rear suspension 19 can be easily mounted to this protruding portion of the motor case 15. Also, the front side of the upper portion of the motor case 15 is placed rearward relative to the front side of the lower portion of the motor case 15. This makes it possible to easily place the battery unit 21 in front of the upper portion of the motor case 15, and extend the battery unit 21 to a position as far to the rear as possible.

The oil pump 28 is placed below the transmission 25 and above the oil pan 27. A rotary shaft 74 of the oil pump 28 is placed below the pivot 17 and below the output shaft 73 of the transmission 25. The rotary shaft 74 of the oil pump 28 is placed between the pivot 17 and the output shaft 73 of the transmission 25 in the forward and rearward direction. Thus, the oil pump 28 is efficiently placed in the space which is below the pivot 17 and the transmission 25 and between the pivot 17 and the transmission 25 in the forward and rearward direction. Since this space is near the oil pan 27, lubricating system components and cooling system components can be compactly arranged. The rotary shaft 74 of the oil pump 28 is activated by the driving power generated by the electric motor 5, and the driving power of the electric motor 5 is transmitted to the rotary shaft 74 of the oil pump 28 via the transmission 25. Therefore, the mechanism for transmitting the driving power to the oil pump 28 can be unitarily accommodated into the motor case 15. Therefore, the mechanism for transmitting the driving power from the electric motor 5 to the oil pump 28 and the casing accommodating the mechanism can be simplified in structure.

An oil passage 77 is provided in the interior of the motor case 15 such that the oil passage 77 surrounds the electric motor 5. An inlet 78 is provided at the upper end portion of the oil passage 77, and an outlet 79 is provided at the lower end portion of the oil passage 77. In this structure, the oil discharged from the oil pump 28 flows through the inlet 78, flows downward through the oil passage 77 by its own weight, and flows out through the outlet 79. The transmission 25 is placed below the electric motor 5, and the oil flowing out through the outlet 79 is returned to the oil pan 27 through the transmission 25. While the oil is returned to the oil pan 27 via the transmission 25, the transmission 25 is lubricated. By arranging the electric motor 5 and the transmission vertically in this way, in a case where the coolant for the electric motor 5 is used as the lubricant for the transmission 25, the lubricant can be guided to the transmission 25 and returned to the oil pan 27 by its own weight. This can simplify the configuration of the cooling system and the configuration of the lubricating system.

Although the embodiments of the present invention have been described above, the above described configuration is merely exemplary, and can be suitably changed within a scope of the invention. Although in the above described embodiment, the oil reserved in the oil pan 27 is used for lubricating bearings for the electric motor 5, cooling the coils of the electric motor 5, cooling the inverter and lubricating the transmission 25, this oil may be used for at least one of these purposes, or otherwise for lubricating or cooling other components, so long as it is used for lubricating or cooling a portion of the electric motorcycle.

Although in the above described embodiment, the motor case 15 accommodates the electric motor 5 together with the transmission 25, a case member accommodating the electric motor 5 and a case member accommodating the transmission 25 may be separable and may be unitarily fastened to each other by fastening means such as bolts. In this case, the lower end portion of the rear suspension 19 may be placed in the bottom portion of the case member accommodating the transmission 25. Or, the lower end portion of the rear suspension may be placed at the lower end of the motor case without providing the motor case.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention has an advantage that the center of gravity of an electric motorcycle can be lowered, and is effectively applied to an electric motorcycle including a rear suspension.

The invention claimed is:

1. An electric motorcycle which activates a rear wheel by using driving power generated by an electric motor, the electric motorcycle comprising:
   a vehicle body frame;
   a motor case which is provided at a rear portion of the vehicle body frame and accommodates the electric motor;
   a swing arm which is pivotably coupled at its front end portion to the rear portion of the vehicle body frame and supports the rear wheel by its rear end portion such that the rear wheel is rotatable; and
   a rear suspension coupled to the vehicle body frame and the swing arm,
   wherein a lower end portion of the rear suspension is located below the swing arm, and the rear suspension extends vertically in a location close to a pivot around which the swing arm is pivotable,
   wherein the electric motorcycle further comprises a link mechanism which is placed below the swing arm and operates according to a pivot motion of the swing arm,
   wherein the link mechanism includes a suspension bracket which is pivotable with respect to the vehicle body frame and the swing arm,
   wherein the lower end portion of the rear suspension is coupled to the suspension bracket and connected to the swing arm via the link mechanism, and
   wherein the suspension bracket is pivotably coupled to a bottom portion of the motor case.

2. The electric motorcycle according to claim 1, wherein the bottom portion of the motor case constitutes an oil pan reserving oil for cooling or lubricating a portion of the electric motorcycle, and the suspension bracket is coupled to the oil pan.

3. The electric motorcycle according to claim 1, wherein an upper end and a lower end of the rear suspension are located rearward relative to the pivot.

4. The electric motorcycle according to claim 1, wherein the vehicle body frame includes a main frame including a down frame member extending downward from a head pipe and a lower frame member extending rearward from a lower end of the down frame member, and
   wherein the lower end portion of the rear suspension is located below the lower frame member.

5. The electric motorcycle according to claim 1, comprising:
   a battery case accommodating a battery as an electric power supply for the electric motor,
   wherein the battery case is supported on the lower frame member of the vehicle body frame, and
   wherein the lower end portion of the rear suspension is located below the lower frame member.

6. An electric motorcycle which activates a rear wheel by using driving power generated by an electric motor, the electric motorcycle comprising:
   a vehicle body frame;
   a motor case which is provided at a rear portion of the vehicle body frame and accommodates the electric motor;
   a swing arm which is pivotably coupled at its front end portion to the rear portion of the vehicle body frame and supports the rear wheel by its rear end portion such that the rear wheel is rotatable; and
   a rear suspension coupled to the vehicle body frame and the swing arm,
   wherein a lower end portion of the rear suspension is located below the swing arm, and the rear suspension extends vertically in a location close to a pivot around which the swing arm is pivotable, and
   wherein an upper end portion of the rear suspension is connected to the motor case.

7. The electric motorcycle according to claim 6, comprising:
   a link mechanism which is placed below the swing arm and operates according to a pivot motion of the swing arm,
   wherein the link mechanism includes a suspension bracket which is pivotable with respect to the vehicle body frame and the swing arm, and
   wherein the lower end portion of the rear suspension is coupled to the suspension bracket and connected to the swing arm via the link mechanism.

8. The electric motorcycle according to claim 6,
   wherein the motor case accommodates the electric motor and a transmission mechanism which changes a speed of driving power generated by the electric motor, and
   wherein the electric motor and the transmission are arranged substantially vertically, the rear suspension extends substantially vertically to conform in shape to a rear surface of the motor case, and the upper end portion of the rear suspension is connected to an upper portion of the motor case.

9. The electric motorcycle according to claim 6,
   wherein the motor case has a coupling portion coupled to the vehicle body frame, above a location at which the upper end portion of the rear suspension is connected to the motor case.

10. The electric motorcycle according to claim 8,
    wherein the electric motor is placed rearward relative to the transmission mechanism.

11. The electric motorcycle according to claim 8,
    wherein an input shaft of the transmission mechanism is placed above the pivot.

12. The electric motorcycle according to claim 8,
    wherein the motor case includes a passage through which a coolant for the electric motor is guided to the transmission mechanism as a lubricant.

13. An electric motorcycle which activates a rear wheel by using driving power generated by an electric motor, the electric motorcycle comprising:
    a vehicle body frame;
    a motor case which is provided at a rear portion of the vehicle body frame and accommodates the electric motor;
    a swing arm which is pivotably coupled at its front end portion to the rear portion of the vehicle body frame and supports the rear wheel by its rear end portion such that the rear wheel is rotatable; and
    a rear suspension coupled to the vehicle body frame and the swing arm,
    wherein a lower end portion of the rear suspension is located below the swing arm, and the rear suspension extends vertically in a location close to a pivot around which the swing arm is pivotable, and
    wherein the pivot is mounted to the motor case.

14. An electric motorcycle which activates a rear wheel by using driving power generated by an electric motor, the electric motorcycle comprising:
a vehicle body frame;
a motor case which is provided at a rear portion of the vehicle body frame and accommodates the electric motor;
a swing arm which is pivotably coupled at its front end portion to the rear portion of the vehicle body frame and supports the rear wheel by its rear end portion such that the rear wheel is rotatable; and
a rear suspension coupled to the vehicle body frame and the swing arm,
wherein a lower end portion of the rear suspension is located below the swing arm, and the rear suspension extends vertically in a location close to a pivot around which the swing arm is pivotable,
wherein the electric motorcycle further comprises a link mechanism which is placed below the swing arm and operates according to a pivot motion of the swing arm,
wherein the link mechanism includes a suspension bracket which is pivotable with respect to the vehicle body frame and the swing arm,
wherein the lower end portion of the rear suspension is coupled to the suspension bracket and connected to the swing arm via the link mechanism,
wherein the suspension bracket is coupled to the motor case such that the link mechanism is fastened to the vehicle body frame, and
wherein the lower end portion of the rear suspension is placed rearward relative to a location at which the suspension bracket is fastened to the motor case.

\* \* \* \* \*